US011003034B2

(12) United States Patent
Huang et al.

(10) Patent No.: US 11,003,034 B2
(45) Date of Patent: May 11, 2021

(54) DISPLAY DEVICE (71) Applicant: AU Optronics (Kunshan) Co., Ltd., Kunshan (CN)

(72) Inventors: Chung-Yu Huang, Kunshan (CN); Jian-Feng Li, Kunshan (CN); Kai-Yuan Siao, Kunshan (CN)

(73) Assignee: AU OPTRONICS (KUNSHAN) CO., LTD., Kunshan (CN)

( * ) Notice: Subject to any disclaimer, the term of this patent is extended or adjusted under 35 U.S.C. 154(b) by 0 days.

(21) Appl. No.: 16/630,655

(22) PCT Filed: Sep. 13, 2018

(86) PCT No.: PCT/CN2018/105425
§ 371 (c)(1),
(2) Date: Jan. 13, 2020

(87) PCT Pub. No.: WO2019/223188
PCT Pub. Date: Nov. 28, 2019

(65) Prior Publication Data
US 2020/0166815 A1 May 28, 2020

(30) Foreign Application Priority Data

May 23, 2018 (CN) .......................... 201810503653.X (51) Int. Cl.
G02F 1/1362 (2006.01)
G09G 3/36 (2006.01)

(52) U.S. Cl.
CPC ..... *G02F 1/136286* (2013.01); *G09G 3/3696* (2013.01); *G09G 2310/0297* (2013.01)

(58) Field of Classification Search
None
See application file for complete search history.

(56) References Cited

U.S. PATENT DOCUMENTS

2005/0140666 A1 6/2005 Shin
2010/0149083 A1* 6/2010 Park ..................... G09G 3/3611
345/99

(Continued)

FOREIGN PATENT DOCUMENTS

CN 1637794 A 7/2005
CN 103400564 A 11/2013
(Continued)

*Primary Examiner* — Aneeta Yodichkas
(74) *Attorney, Agent, or Firm* — WPAT, PC (57) ABSTRACT The present invention relates to a display device comprising: a display panel having a plurality of pixels and a plurality of source lines, wherein each of the pixels is electrically connected to a respective source line; and an SD IC for providing pixel voltages and receiving a noise storage control signal and a noise output control signal; characterized in that the SD IC further comprises a noise reduce module to store voltage levels of the pixel voltages as compensating voltages based on the noise storage control signal and to output the compensating voltages based on the noise output control signal, wherein during a normal period, the SD IC outputs the pixel voltages to the pixels; during a compensation period, the SD IC outputs the compensating voltages to the pixels; wherein the noise output control signal is phased-delayed with respect to the noise storage control signal.

15 Claims, 3 Drawing Sheets (56) References Cited

U.S. PATENT DOCUMENTS

2014/0218331 A1    8/2014  Chang et al.
2016/0275897 A1*  9/2016  Lin ..................... G09G 3/3648

FOREIGN PATENT DOCUMENTS

| CN | 108417173 A | 8/2018 |
|----|-------------|--------|
| TW | I675363 B   | 10/2019 |

* cited by examiner

DISPLAY DEVICE

TECHNICAL FIELD

The present invention relates to a display device, and more particularly to a display device comprising a noise reduce circuit.

BACKGROUND

Liquid crystal displays (LCDs) have been widely used in variety applications due to its outstanding advantages such as low voltage driving, low power consumption and so forth. Especially for portable electronic products, the application of liquid crystal displays, such as STN and TFT, etc., has made them develop rapidly. The analog output of a LCD driver IC directly drives a LCD panel to perform a controlling operation of a pixel array of a LCD, so the LCD driver IC is a core device of the LCD. The LCD driver IC comprises a source driver IC (SD IC) which stores the input digital video signal in a buffer, and converts the digital video signal into pixel voltages to be output to the pixels in response to the activation of a source scanning signal, to drive the source lines of the LCD panel.

A touch pen provides better experience to users due to its precision and the improvement of the related technologies, so that more and more manufacturers adopt it. Because panels manufactured by panel factories are different in architecture and manufacture procedure, there must be the same specifications for a touch IC with respect to testing and calculation to be followed by the panel factories, in order to facilitate the matching and application of the touch pen with each panel. At present, the low temperature poly-silicon (LTPS) technology adopts architecture of a multiplexer (MUX), which has a product positioning of high-end product, so it is necessary to tie a touch pen to it. However, as for the specifications defined currently for the touch IC, actual measurements show that the noise might be larger than what is specified in the specifications.

SUMMARY

An embodiment of the present invention provides a display device having a noise reduce module, the display device comprising: a display panel having a plurality of pixels and a plurality of source lines, wherein each of the pixels is electrically connected to a respective source line; and an SD IC for providing pixel voltages and receiving a noise storage control signal and a noise output control signal; characterized in that the SD IC further comprises a noise reduce module to store voltage levels of the pixel voltages as a compensating voltages based on the noise storage control signal and to output the compensating voltages based on the noise output control signal, wherein during a normal period, the SD IC outputs the pixel voltages to the pixels; and during a compensation period, the SD IC outputs the compensating voltages to the pixels; wherein the noise output control signal is phase-delayed with respect to the noise storage control signal.

For the display device in the embodiment of the present invention, wherein the SD IC further comprises a pixel data source module and a pixel data output module, and the noise reduce module is electrically connected to the pixel data source module and the pixel data output module separately.

For the display device in the embodiment of the present invention, wherein the noise reduce module further comprises a noise control module and a compensation storage module, wherein the noise control module is electrically connected to the pixel data source module or the compensation storage module selectively based on the noise output control signal and a pixel voltage output control signal, and the compensation storage module is electrically connected to the pixel data source module selectively based on the noise storage control signal.

For the display device in the embodiment of the present invention, wherein the noise control module further comprises:

an AND gate having a first AND gate input terminal, a second AND gate input terminal and an AND gate output terminal, the first AND gate input terminal receiving the pixel voltage output control signal, and the second AND gate input terminal receiving the noise output control signal; a NOT gate having a NOT gate input terminal and a NOT gate output terminal, the NOT gate input terminal being electrically connected to the AND gate output terminal; and control circuit module electrically connected to the AND gate output terminal and the NOT gate output terminal, respectively.

For the display device in the embodiment of the present invention, wherein each of the control circuits comprises: a first switch having an input terminal, an output terminal and a control terminal, the input terminal of the first switch being electrically connected to the pixel data source module, the output terminal of the first switch being electrically connected to the pixel data output module, and the control terminal of the first switch being electrically connected to the AND gate output terminal; and a second switch having an input terminal, an output terminal and a control terminal, the input terminal of the second switch being electrically connected to the compensation storage module, the output terminal of the second switch being electrically connected to the pixel data output module, and the control terminal of the second switch being electrically connected to the NOT gate output terminal.

For the display device in the embodiment of the present invention, wherein the SD IC further comprises a third switch having an input terminal, an output terminal and a control terminal, wherein the input terminal of the third switch is electrically connected to the pixel data source module, the output terminal of the third switch is electrically connected to the compensation storage module, and the control terminal of the third switch receives the noise storage control signal.

For the display device in the embodiment of the present invention, wherein the pixels have a first group of pixels and a second group of pixels, and the source lines have a first group of source lines and a second group of source lines, wherein the display device further comprises:

a multiplexer circuit module that receives a first switch control signal and a second switch control signal, and the multiplex circuit module is electrically connected to the source lines and the SD IC respectively, wherein when the first switch control signal is at an enable potential, the multiplex circuit module causes the SD IC to be electrically connected to the first group of source lines, such that the pixel voltages are input into the first group of pixels via the first group of source lines, and when the second switch control signal is at the enable potential, the multiplex circuit module causes the SD IC to be electrically connected to the second group of source lines, such that the pixel voltages are input into the second group of pixels via the second group of source lines.

For the display device in the embodiment of the present invention, wherein a phase delay of the noise output control signal with respect to the noise storage control signal is two display frames.

For the display device in the embodiment of the present invention, wherein the pixels are divided into a plurality of groups of pixels, the source lines are divided into a plurality of groups of source lines, and the plurality of groups of source lines correspond to the plurality of groups of pixels, respectively, wherein the display device further comprises: a multiplexer circuit module that receives a plurality of switch control signals, and the multiplex circuit module is electrically connected to the source lines and the SD IC, respectively, and it can be selected, wherein the pixel voltages are electrically connected to the plurality of groups of pixels via a corresponding one of the plurality of groups of source lines based on the switch control signal.

For the display device in the embodiment of the present invention, wherein the number of the switch control signals is N, and the phase delay of the noise output control signal with respect to the noise storage control signal is N display frames, where N is a positive integer and N>1.

Another embodiment of the present invention provides a display device comprising: a display panel having a plurality of pixels and a plurality of source lines, wherein each of the pixels is electrically connected to a respective source line; and an SD IC for receiving a pixel voltage output control signal, a noise storage control signal, and a noise output control signal; characterized in that, during a first normal period, the pixel voltage output control signal is at an enable potential, the noise storage control signal is at the enable potential, and the noise output control signal is at a disable potential, while the SD IC outputs a first group of pixel voltages; during a second normal period, the pixel voltage output control signal is at the enable potential, the noise storage control signal is at the enable potential, and the noise output control signal is at the disable potential, while the SD IC outputs a second group of pixel voltages; during a first compensation period, the pixel voltage output control signal is at the enable potential, the noise storage control signal is at the enable potential, and the noise output control signal is at the enable potential, while the SD IC outputs the first group of pixel voltages; during a second compensation period, the pixel voltage output control signal is at the enable potential, the noise storage control signal is at the enable potential, and the noise output control signal is at the enable potential, while the SD IC outputs the second group of pixel voltages.

For the display device in the other embodiment of the present invention, wherein the noise reduce module further comprises a noise control module and a compensation storage module, wherein the noise control module is electrically connected to the pixel data source module or the compensation storage module selectively based on the noise output control signal and the pixel voltage output control signal, and the compensation storage module is electrically connected to the pixel data source module selectively based on the noise storage control signal.

For the display device in the other embodiment of the present invention, wherein the noise control module further comprises: an AND gate having a first AND gate input terminal, a second AND gate input terminal and an AND gate output terminal, the first AND gate input terminal receiving the pixel voltage output control signal, and the second AND gate input terminal receiving the noise output control signal; a NOT gate having a NOT gate input terminal and a NOT gate output terminal, the NOT gate input terminal being electrically connected to the AND gate output terminal; and control circuit module electrically connected to the AND gate output terminal and the NOT gate output terminal, respectively.

For the display device in the other embodiment of the present invention, wherein each of the control circuit module each comprises: a first switch having an input terminal, an output terminal and a control terminal, the input terminal of the first switch being electrically connected to the pixel data source module, the output terminal of the first switch being electrically connected to the pixel data output module, and the control terminal of the first switch being electrically connected to the AND gate output terminal; and a second switch having an input terminal, an output terminal and a control terminal, the input terminal of the second switch being electrically connected to the compensation storage module, the output terminal of the second switch being electrically connected to the pixel data output module, and the control terminal of the second switch being electrically connected to the NOT gate output terminal.

For the display device in the other embodiment of the present invention, wherein the SD IC further comprises a third switch having an input terminal, an output terminal and a control terminal, wherein the input terminal of the third switch is electrically connected to the pixel data source module, the output terminal of the third switch is electrically connected to the compensation storage module, and the control terminal of the third switch receives the noise storage control signal.

| reference numerals: | |
|---|---|
| 10: display device | 100: display panel |
| 110: pixel | 111: first group of pixels |
| 112: second group of pixels | 120: source line |
| 200: SD IC | 210: pixel data source module |
| 220: pixel data output module | 230: compensation storage module |
| 240: noise control module | 241: control circuit module |
| 300: multiplex circuit module | AND: AND gate |
| NOT: NOT gate | SW1: first switch |
| SW2: second switch | SW3: third switch |
| D1: first group of source lines | D2: second group of source lines |
| Frame 1, Frame 2, Frame 3, Frame 4, | |
| Frame 5: display frame | |
| CPI: first compensation period | CP2: second compensation period |
| Normal 1, Normal 2, Normal 3, | |
| Normal 4: normal period | |
| XSTB: pixel voltage output control signal | |
| NR_EN: noise storage control signal | |
| NR_EN Daley: noise output control signal | |
| SD OUT: SD IC output voltage | |
| Data, Data 1, Data 2, Data 3, Data 4, | |
| Data 5: pixel data | |

BEST WAY TO CARRY OUT THE INVENTION

The specific implementations of the present invention will be illustrated in detail below with reference to the accompanying drawings to make the objects, features and advantages of the invention as described above become more apparent and straightforward. Specific details are set forth in the following description in order to provide a thorough understanding of the invention. However, the invention can be carried out in many other ways than those described herein, those skilled in the art can make similar improvements without departing from the spirit of the invention, and the invention therefore is not limited by the particular embodiments disclosed below.

As used herein, "first", "second", and the like do not particularly mean an order or sequence, are not intended to limit the invention, and are only intended to distinguish between elements or operations described with the same terminologies.

As used herein, "electrical connected to" may mean that two or more elements are directly in physical or electrical contact with each other, or indirectly in physical or electrical contact with each other, and "electrical connected to" may also refer to the mutual operation or action of two or more elements.

As used herein, "including", "having", "containing", and the like are all open-ended words, meaning to include but not limited to.

Each of the terms used herein has its own usual meaning used in the art, in the context disclosed herein, and in particular contents, unless otherwise stated. Certain terms used to describe the present disclosure will be discussed below or elsewhere in this specification to provide additional guidance to those skilled in the art in connection with the description of the disclosure.

Figure 1:
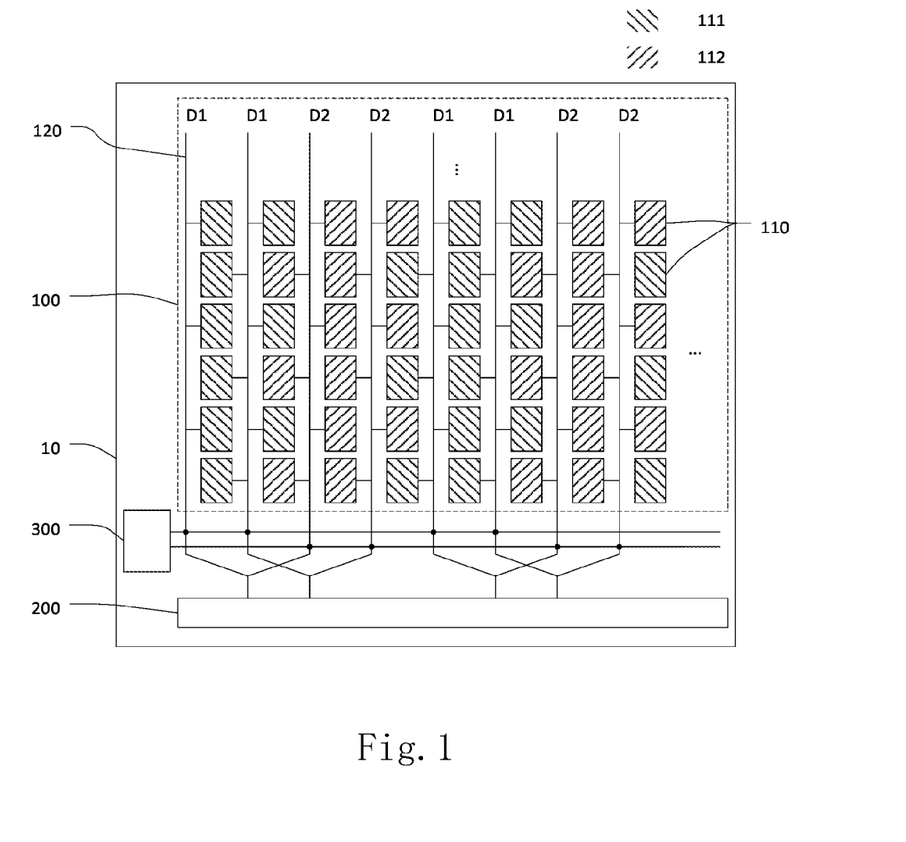
FIG. 1 is a schematic structural view of a display device of an embodiment of the present invention.

FIG. 1 is a schematic structural view of a display device according to an embodiment of the present invention. As shown in FIG. 1, in the embodiment of the present invention, the display device 10 comprises: a display panel (Cell) 100, a gate driver IC, and an SD IC 200, wherein the display panel 100 comprises a plurality of pixels 110, a plurality of source lines 120 and a plurality of gate lines. Each of the pixels 110 is electrically connected to a respective source line 120 and electrically connected to a respective gate line. The SD IC 200 outputs SD IC output voltage SD OUT to the pixels 110 via the source lines 120, and the SD IC output voltage SD OUT includes a pixel voltage and a compensating voltage. The gate driver IC and the gate lines are omitted in FIG. 1 for clarity of illustration.

Figure 2:
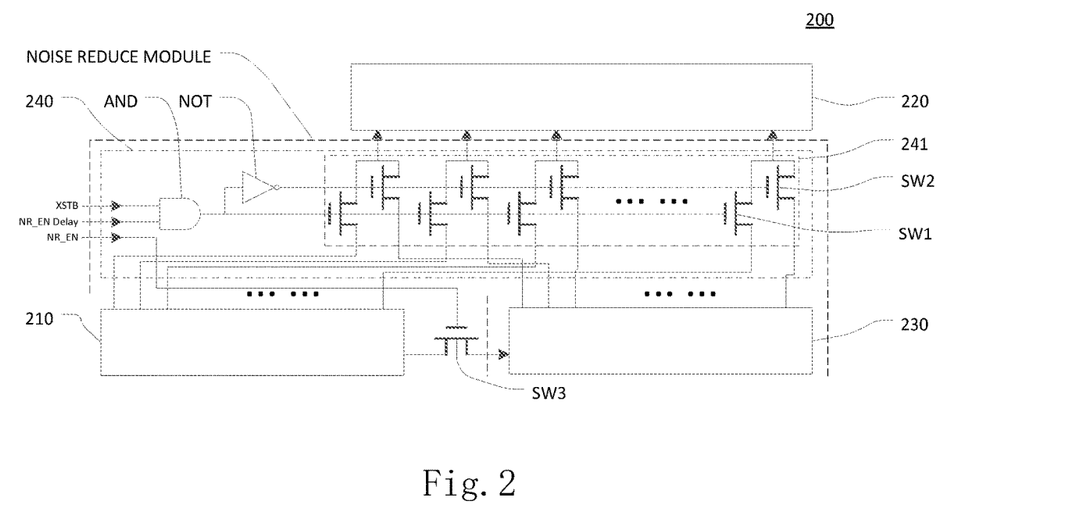
FIG. 2 is a schematic structural view of a SD IC of a display device of an embodiment of the invention.

FIG. 2 is a schematic structural view of a SD IC of a display device of an embodiment of the invention. As shown in FIG. 2, the SD IC 200 comprises: a pixel data source module 210, a pixel data output module 220, and a noise reduce module, wherein the noise reduce module comprises a compensation storage module 230 and a noise control module 240. Specifically, the noise control module 240 includes an AND gate (AND), a NOT gate (NOT), and control circuit module 241. In this embodiment, the input terminal of the AND gate (AND) receives a pixel voltage output control signal XSTB and a noise output control signal NR_EN Daley separately, and the input terminal of the NOT gate (NOT) is electrically connected to the output terminal of the AND gate (AND). The control circuit module 241 include a plurality of pairs of switches, each pair of switches comprising a first switch SW1 and a second switch SW2. Taking the first switch SW1 as an example, it has an input terminal electrically connected to the pixel data source module 210, an output terminal electrically connected to the pixel data output module 220, and a control terminal electrically connected to the output terminal of the AND gate (AND); taking the second switch SW2 as an example, it has an input terminal electrically connected to the compensation storage module 230, an output terminal electrically connected to the pixel data output module 220, and a control terminal electrically connected to the output terminal of the NOT gate (NOT). In particular, the ON and OFF of the first switch SW1 is switched by a signal from the output terminal of the AND gate (AND) for controlling whether to transmit the pixel data (Data) of the pixel data source module 210 to the pixel data output module 220. In addition, the ON and OFF of the second switch SW2 is switched by a signal from the output terminal of the NOT gate (NOT) for controlling whether to transmit the compensation data (Compensation data) of the compensation storage module 230 to the pixel data output module 220. In this way, by selecting the pixel data source module 210 or the compensation storage module 230 by the noise control module 240, data can be transmitted to the pixel data output module 220.

In this embodiment, the SD IC 200 further comprises a third switch SW3, which has an input terminal electrically connected to the pixel data source module 210, an output terminal electrically connected to the compensation storage module 230, and a control terminal receiving a noise storage control signal NR_EN. Specifically, when the noise storage control signal NR_EN is at an enable potential, the pixel data source module 210 outputs the current pixel data (Data) to the compensation storage module 230 via the third switch SW3, and stores it as compensation data (Compensation data). In this embodiment, the pixel data source module 210 can provide or output the pixel data (Data), which, after being input to the pixel data output module 220 via the noise control module 240, is converted into a pixel voltage and output to each pixel via the source lines by the pixel data output module 220. However, the present invention is not limited thereto. In other embodiments, the pixel data source module 210 comprises pixel data (Data) which can be converted into a pixel voltage by the pixel data source module 210. In this way, the pixel data source module 210 can output the pixel voltage to the noise control module 240 and transmit the signal to the pixel data output module 220 and each pixel. In this embodiment, after the compensation data has been input to the pixel data output module 220 via the noise control module 240, the pixel data output module 220 converts the compensation data into a compensating voltage, and outputs it to each pixel via the source lines. However, the present invention is not limited thereto. In another modified embodiment, the pixel data source module 210 comprises pixel data (Data) which can be converted into a pixel voltage by the pixel data source module 210. Therefore, when the pixel voltage is transmitted via the third switch SW3 to the compensation storage module 230, it is stored as a compensating voltage. Alternatively, after the pixel data (Data) is received by the compensation storage module 230, it can be internally converted into a compensating voltage. As such, in the case described above, the compensating voltage can be output by the compensation storage module 230, and then transmitted to the pixel data output module 220 and each pixel via the noise control module 240. In this embodiment, the noise output control signal NR_EN Delay is a phase-delayed with respect to the noise storage control signal NR_EN. In some embodiments, the phase delay of the noise output control signal NR_EN Delay with respect to the noise storage control signal NR_EN is two display frames, but the invention is not limited thereto.

Referring to FIG. 1 again, in another embodiment, the pixels 110 of the display panel 100 are divided into a first group of pixels 111 and a second group of pixels 112, and the source lines 120 are also correspondingly divided into a first group of source lines D1 that are electrically connected to the first group of pixels 111 and a second group of source lines D2 that are electrically connected to the second group of pixels 112. The display device 10 further comprises a multiplex circuit module 300 which is electrically connected to the source lines 120 and the SD IC 200, respectively, and receives a first switch control signal and a second switch control signal. When the first switch control signal is at an enable potential, the multiplex circuit module 300 causes the SD IC 200 to be electrically connected to the first group of source lines D1, such that the pixel voltages is input to the first group of pixels 111 via the first group of source lines D1. When the second switch control signal is at an enable potential, the multiplex circuit module 300 causes the SD IC 200 to be electrically connected to the second group of source lines D2, such that the pixel voltages are input to the second group of pixels 112 via the second group of source lines D2. In order to clearly describe the present invention, a multiplex circuit module 300 with a framework of only two MUXs is provided in another embodiment of the present invention, but in practical applications, it is not necessarily limited to a fixed number of MUXs. That is, the multiplex circuit module 300 has two or more MUXs, and the noise output control signal NR_EN Delay and the noise storage control signal NR_EN is adjusted based on the number of MUXs to achieve the purpose of noise reduction. For example, given a multiplex circuit module 300 with a framework of N MUXs, the number of switch control signals is N, and then the phase delay of the noise output control signal NR_EN Delay with respect to the noise storage control signal NR_EN is N display frames, where N is a positive integer and N 2. The invention is not limited thereto.

In an embodiment of the present invention, only when both the pixel voltage output control signal XSTB and the noise output control signal NR_EN Delay are at an enable potential, does the AND gate (AND) output the enable potential. Then the first switch SW1 of the control circuit module 241 is turned off and the second switch SW2 of the control circuit module 241 is turned on, so that the compensation storage module 230 outputs compensation data to the pixel data output module 220. In other words, the SD IC 200 is in a compensation period. In addition, when the AND gate (AND) outputs a disable potential, the first switch SW1 of the control circuit module 241 is turned on and the second switch SW2 of the control circuit module 241 is turned off, so that the pixel data source module 210 outputs pixel data to the pixel data output module 220. In other words, the SD IC 200 is in a normal period. See Table 1 for details.

TABLE 1

| XSTB | NR_EN Delay | AND Output | Period |
|---|---|---|---|
| Enable | Enable | Enable | Compensation period |
| Enable | Disable | Disable | Normal period |
| Disable | Enable | Disable | Normal period |
| Disable | Disable | Disable | Normal period |

Figure 3:
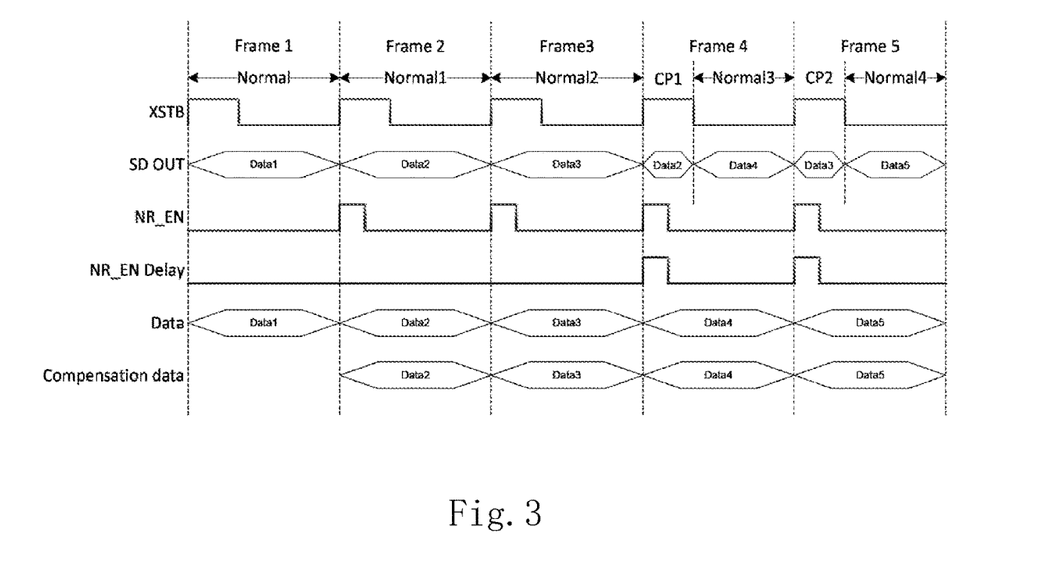
FIG. 3 is a waveform of control signals for a SD IC of a display device of an embodiment of the present invention.

FIG. 3 is a waveform of control signals for a SD IC of a display device of an embodiment of the present invention.

As shown in FIG. 3, the display frame Frame 1, the display frame Frame 2 and the display frame Frame 3 can be regarded as normal output periods, and the SD IC output voltage SD OUT sequentially outputs a high voltage level and a low voltage level. During the display frame Frame 2, the pixel voltage output control signal XSTB is at an enable potential and the noise storage control signal NR_EN is at an enable potential, the compensation storage module 230 then stores, as compensation data, the pixel data output by the pixel data source module 210 during the display frame Frame 2; and during the subsequent N display frame periods, the pixel voltage output control signal XSTB and the noise storage control signal NR_EN are both at enable potential, and the compensation storage module 230 stores, as N pieces of compensation data, the pixel data output by the pixel data source module 210 during the N display frame periods. When the pixel voltage output control signal XSTB is at an enable potential and the noise output control signal NR_EN Delay is at an enable potential, the compensation storage module 230 outputs the compensation data to the pixel data output module 220, so that the SD IC output voltage SD OUT sequentially outputs the pixel voltages during the first N display frame periods.

Please refer to FIG. 3 again. As shown in FIG. 3, the noise output control signal NR_EN Delay is delayed with respect to the noise storage control signal NR_EN by two phases. In this embodiment, when the pixel voltage output control signal XSTB is at an enable potential, the SD IC 200 provides a voltage SD OUT to each pixel. Referring to the embodiment of FIG. 3, the display frame Frame 1 is a normal output period, during which the noise storage control signal NR_EN and the noise output control signal NR_EN Delay are both at a disable potential, and the pixel data Data1 is output from the pixel data source module 210 to the pixel data output module 220, such that the SD IC 200 provides the pixel data Data1 to each pixel. The display frame Frame 2 is a normal output period, during which the noise storage control signal NR_EN is at an enable potential, the noise output control signal NR_EN Delay is at a disable potential, and the pixel data Data2 is output from the pixel data source module 210 to the pixel data output module 220 and the compensation storage module 230. Since the noise storage control signal NR_EN is changed from the disable potential of the previous display frame to the enable potential, the compensation storage module 230 starts storing the pixel data Data2 as compensation data (Compensation data), as shown in FIG. 3, and during the display frame Frame 2, the compensation storage module 230 stores the pixel data Data2. Meanwhile, since the noise output control signal NR_EN Delay is at a disable potential, the SD IC 200 provides the pixel data Data2 to each pixel under the control of the noise control module 240. The display frame Frame 3 is a normal output period, during which the noise storage control signal NR_EN is at an enable potential, the noise output control signal NR_EN Delay is at a disable potential, and the pixel data Data3 is output from the pixel data source module 210 to the pixel data output module 220 and the compensation storage module 230. The same action is conducted during the display frame Frame 3 as the display frame Frame 2, to store the pixel data Data3 as compensation data (Compensation data) by the compensation storage module 230, as shown in FIG. 3. Meanwhile, since the noise output control signal NR_EN Delay is at a disable potential, the SD IC 200 provides the pixel data Data3 to each pixel under the control of the noise control module 240.

Referring to FIG. 3 again, the display frame Frame 4 is a compensation output period, during which both the noise storage control signal NR_EN and the noise output control signal NR_EN Delay are at an enable potential, wherein, under the control of the noise storage control signal NR_EN at the enable potential, the pixel data Data4 is output from the pixel data source module 210 to the compensation storage module 230, which stores the pixel data Data4 as compensation data. Meanwhile, under the action of the noise storage control signal NR_EN at the enable potential, after the noise control module 240, the SD IC 200 sequentially provides the compensation data stored in the compensation storage module 230. Since the noise output control signal NR_EN Delay is changed from the disable potential of the previous display frame to the enable potential, the compensation storage module 230 starts outputting the compensation data. As seen in the embodiment of FIG. 3, the first compensation data of the compensation storage module 230 is the pixel data Data2. Therefore, during this period, the compensation storage module 230 causes the SD IC 200 to output pixel data (data2) (considered as SD OUT) to each pixel through the noise control module 240. During the second half of the display frame Frame 4, since the noise output control signal NR_EN Delay is restored to the disable potential, the SD IC 200 provides the pixel data Data4 (from the pixel data source module 210) via the noise control module 240. As illustrated by the display frame Frame 4 of FIG. 3, during the first half of the display frame Frame 4, both the noise storage control signal NR_EN and the noise output control signal NR_EN Delay are at the enable potential, so this first half is a compensation output period CP1. During the second half of the display frame Frame 4, the noise output control signal NR_EN Delay is at the disable potential, so this second half is a normal output period Normal3.

In this embodiment, the display frame Frame 5 is also a compensation output period, during which both the noise storage control signal NR_EN and the noise output control signal NR_EN Delay are at the enable potential, wherein under the control of the noise storage control signal NR_EN at the enable potential, the pixel data Data5 is output from the pixel data source module 210 to the compensation storage module 230, which stores the pixel data Data5 as compensation data. Meanwhile, under the action of the noise storage control signal NR_EN at the enable potential, after the noise control module 240, the SD IC 200 sequentially provides the compensation data stored in the compensation storage module 230. As seen in the embodiment of FIG. 3, the second compensation data of the compensation storage module 230 is the pixel data Data3, and therefore, during this period, the compensation storage module 230 causes the SD IC 200 to output pixel data (data3) (considered as SD OUT) to each pixel through the noise control module 240. During the second half of the display frame Frame 5, since the noise output control signal NR_EN Delay is restored to the disable potential, the SD IC 200 provides the pixel data Data5 (from the pixel data source module 210) via the noise control module 240. As illustrated by the display frame Frame 5 of FIG. 3, during the first half of the display frame Frame 5, both the noise storage control signal NR_EN and the noise output control signal NR_EN Delay are at the enable potential, so this first half is a compensation output period CP2. During the second half of the display frame Frame 4, the noise output control signal NR_EN Delay is at the disable potential, so this second half is a normal output period Normal4.

In other words, in this embodiment, when the noise output control signal NR_EN Delay is delayed with respect to the noise storage control signal NR_EN by two phases, during the display frame Frame 2 as the first normal period Normal1, the SD IC 200 outputs a first group of pixel voltages (such as pixel data data2); during the display frame Frame3 as the second normal period Normal2, the SD IC 200 outputs a second group of pixel voltages (such as pixel data data3); taking the display frame Frame4 as the first compensation period CP1 and the third normal period Normal3, the SD IC 200 outputs a first group of pixel voltages (such as pixel data data2) during the first compensation period CP1, and outputs a third group of pixel voltages (such as pixel data data4) during the third normal period Normal3; taking the display frame Frame5 as the second compensation period CP2 and the fourth normal period Normal4, the SD IC 200 outputs a second group of pixel voltages (such as pixel data data3) during the second compensation period CP2, and outputs a fourth group of pixel voltages (such as pixel data data5) during the fourth normal period Normal4. In this example, the first normal period, the second normal period, the first compensation period, the third normal period, the second compensation period and the fourth normal period are in a consecutive timing sequence. Specifically, there is a difference of two display frames between the first normal period and the first compensation period. Taking FIG. 3 as an example, the first normal period Normal1 is the display frame Frame2, and the first compensation period CP1 is the display frame Frame4, but the invention is not limited thereto. In some embodiments, the noise output control signal NR_EN Delay is delayed with respect to the noise storage control signal NR_EN by N phases, where N>2, including the first normal period, . . . , the N normal period, the first compensation period, the N+1 normal period, the second compensation period, the N+2 normal period, . . . , of the consecutive timing sequence.

Figure 4:
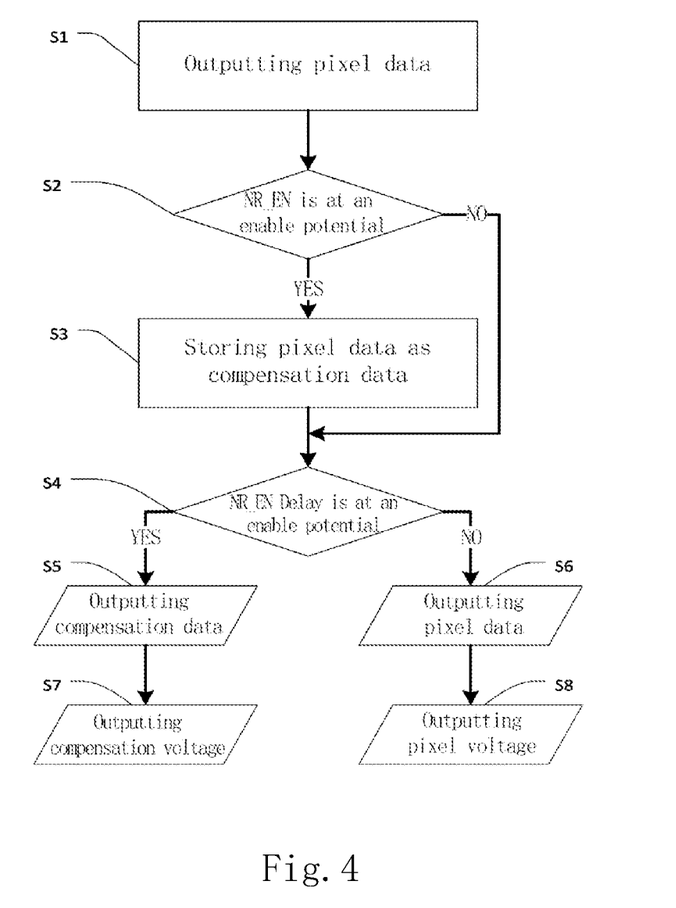
FIG. 4 is a flow chart showing the operation of a SD IC of a display device of an embodiment of the present invention.

FIG. 4 is a flow chart showing the operation of a SD IC of a display device of an embodiment of the present invention. As shown in FIG. 4, in an embodiment of the present invention, the output voltage SD OUT of the SD IC 200 is output by the following steps:

step S1: the pixel data source module 210 outputting pixel data;

step S2: the third switch SW3 of the noise reduce module receiving the noise storage control signal NR_EN;

step S3: when the noise storage control signal NR_EN is at an enable potential, the compensation storage module 230 storing the pixel data output by the pixel data source module 210 as compensation data; otherwise, the pixel data source module 210 outputting the pixel data to the pixel data output module 220;

step S4: the control circuit module 241 of the noise reduce module receiving the noise output control signal NR_EN Delay;

step S5: when the noise output control signal NR_EN Delay is at an enable potential, turning on the second switch SW2 of the control circuit module 241, so that the compensation storage module 230 outputs compensation data to the pixel data output module 220;

step S6: when the noise output control signal NR_EN Delay is at a disable potential, turning on the first switch SW1 of the control circuit module 241, so that the pixel data source module 210 outputs pixel data to the pixel data output module 220;

step S7: the compensation data being converted into a compensating voltage by the pixel data output module 220, and output to the pixels 110 via the source lines 120; and step S8: the pixel data being converted into a pixel voltage by the pixel data output module 220, and output to the pixels 110 via the source lines 120.

While the present invention has been disclosed in the above embodiments, the embodiments are not intended to limit the present invention, and any equivalent modifications or changes are made by any person skilled in the art without departing from the spirit and scope of the invention and shall all be included in the scope of the claims of the present invention.

INDUSTRIAL APPLICABILITY

In the present invention, a noise control circuit is added to an SD IC of a display device to output the first N pixel voltages, so as to offset the noise formed by a difference between the internal voltage of the display panel and the current pixel voltage when the multiplex circuit is swathed on. The operational period of the noise control circuit is a gap during the SD IC's output of pixel voltages, not affecting the effective charging time for the pixels by the SD IC. Moreover, the present invention controls when to output a compensating voltage with a noise output control signal, and is adapted to a display device equipped with multiple multiplexer circuit.

The invention claimed is:

1. A display device comprising:
   a display panel having a plurality of pixels and a plurality of source lines, wherein each of the pixels is electrically connected to a respective source line; and
   an SD IC for providing pixel voltages and receiving a noise storage control signal and a noise output control signal, and the SD IC further comprises a noise reduce module to store voltage levels of the pixel voltages as compensating voltages based on the noise storage control signal and to output the compensating voltages based on the noise output control signal,
   wherein during a normal period, the SD IC outputs the pixel voltages to the pixels; and during a compensation period, the SD IC outputs the compensating voltages to the pixels;
   wherein the noise output control signal is phase-delayed with respect to the noise storage control signal.

2. The display device according to claim 1, the SD IC further comprises a pixel data source module and a pixel data output module, and the noise reduce module is electrically connected to the pixel data source module and the pixel data output module separately.

3. The display device according to claim 2, the noise reduce module further comprises a noise control module and a compensation storage module, wherein the noise control module is electrically connected to the pixel data source module or the compensation storage module selectively based on the noise output control signal and a pixel voltage output control signal, and the compensation storage module is electrically connected to the pixel data source module selectively based on the noise storage control signal.

4. The display device according to claim 3, the noise control module further comprises:
   an AND gate having a first AND gate input terminal, a second AND gate input terminal and an AND gate output terminal, the first AND gate input terminal receiving the pixel voltage output control signal, and the second AND gate input terminal receiving the noise output control signal;
   a NOT gate having a NOT gate input terminal and a NOT gate output terminal, the NOT gate input terminal being electrically connected to the AND gate output terminal; and
   a control circuit module electrically connected to the AND gate output terminal and the NOT gate output terminal, respectively.

5. The display device according to claim 4, the control circuit module comprises:
   a first switch having an input terminal, an output terminal and a control terminal, the input terminal of the first switch being electrically connected to the pixel data source module, the output terminal of the first switch being electrically connected to the pixel data output module, and the control terminal of the first switch being electrically connected to the AND gate output terminal; and
   a second switch having an input terminal, an output terminal and a control terminal, the input terminal of the second switch being electrically connected to the compensation storage module, the output terminal of the second switch being electrically connected to the pixel data output module, and the control terminal of the second switch being electrically connected to the NOT gate output terminal.

6. The display device according to claim 3, the SD IC further comprises a switch having an input terminal, an output terminal and a control terminal, wherein the input terminal of the switch is electrically connected to the pixel data source module, the output terminal of the switch is electrically connected to the compensation storage module, and the control terminal of the switch receives the noise storage control signal.

7. The display device according to claim 1, the pixels have a first group of pixels and a second group of pixels, and the source lines have a first group of source lines and a second group of source lines, wherein the display device further comprises:
   a multiplexer circuit module that receives a first switch control signal and a second switch control signal, and the multiplex circuit module is electrically connected to the source lines and the SD IC respectively, wherein when the first switch control signal is at an enable potential, the multiplex circuit module causes the SD IC to be electrically connected to the first group of source lines, such that the pixel voltages are input into the first group of pixels via the first group of source lines, and when the second switch control signal is at the enable potential, the multiplex circuit module causes the SD IC to be electrically connected to the second group of source lines, such that the pixel voltages are input into the second group of pixels via the second group of source lines.

8. The display device according to claim 7, wherein a phase delay of the noise output control signal with respect to the noise storage control signal is two display frames.

9. The display device according to claim 1, wherein the pixels are divided into a plurality of groups of pixels, the source lines are divided into a plurality of groups of source lines, and the plurality of groups of source lines correspond to the plurality of groups of pixels, respectively, wherein the display device further comprises:
   a multiplexer circuit module that receives a plurality of switch control signals, and the multiplex circuit module is electrically connected to the source lines and the SD IC, respectively, and it can be selected, wherein the pixel voltages are electrically connected to the plurality of groups of pixels via a corresponding one of the plurality of groups of source lines based on the switch control signal.

10. The display device according to claim 9, wherein the number of the switch control signals is N, and the phase delay of the noise output control signal with respect to the noise storage control signal is N display frames, where N is a positive integer and N>1.

11. A display device comprising:
 a display panel having a plurality of pixels and a plurality of source lines, wherein each of the pixels is electrically connected to a respective source line; and
 an SD IC for receiving a pixel voltage output control signal, a noise storage control signal, and a noise output control signal;
 during a first normal period, the pixel voltage output control signal is at an enable potential, the noise storage control signal is at the enable potential, and the noise output control signal is at a disable potential, while the SD IC outputs a first group of pixel voltages;
 during a second normal period, the pixel voltage output control signal is at the enable potential, the noise storage control signal is at the enable potential, and the noise output control signal is at the disable potential, while the SD IC outputs a second group of pixel voltages;
 during a first compensation period, the pixel voltage output control signal is at the enable potential, the noise storage control signal is at the enable potential, and the noise output control signal is at the enable potential, while the SD IC outputs the first group of pixel voltages;
 during a second compensation period, the pixel voltage output control signal is at the enable potential, the noise storage control signal is at the enable potential, and the noise output control signal is at the enable potential, while the SD IC outputs the second group of pixel voltages.

12. The display device according to claim 11, the SD IC further comprises a noise reduce module, a pixel data source module and a pixel data output module, the noise reduce module comprises a noise control module and a compensation storage module, wherein the noise control module is electrically connected to the pixel data source module or the compensation storage module selectively based on the noise output control signal and the pixel voltage output control signal, and the compensation storage module is electrically connected to the pixel data source module selectively based on the noise storage control signal.

13. The display device according to claim 12, the noise control module further comprises:
 an AND gate having a first AND gate input terminal, a second AND gate input terminal and an AND gate output terminal, the first AND gate input terminal receiving the pixel voltage output control signal, and the second AND gate input terminal receiving the noise output control signal;
 a NOT gate having a NOT gate input terminal and a NOT gate output terminal, the NOT gate input terminal being electrically connected to the AND gate output terminal; and
 a control circuit module electrically connected to the AND gate output terminal and the NOT gate output terminal, respectively.

14. The display device according to claim 13, the control circuit module each comprises:
 a first switch having an input terminal, an output terminal and a control terminal, the input terminal of the first switch being electrically connected to the pixel data source module, the output terminal of the first switch being electrically connected to the pixel data output module, and the control terminal of the first switch being electrically connected to the AND gate output terminal; and
 a second switch having an input terminal, an output terminal and a control terminal, the input terminal of the second switch being electrically connected to the compensation storage module, the output terminal of the second switch being electrically connected to the pixel data output module, and the control terminal of the second switch being electrically connected to the NOT gate output terminal.

15. The display device according to claim 12, the SD IC further comprises a switch having an input terminal, an output terminal and a control terminal, wherein the input terminal of the switch is electrically connected to the pixel data source module, the output terminal of the switch is electrically connected to the compensation storage module, and the control terminal of the switch receives the noise storage control signal.

* * * * *